US012793233B2

(12) United States Patent
Gillissen

(10) Patent No.: US 12,793,233 B2
(45) Date of Patent: Nov. 10, 2026

(54) REDUCTION OF VIDEO MATERIAL TO MOTION SECTIONS

(71) Applicant: BAYER ANIMAL HEALTH GMBH, Leverkusen (DE)

(72) Inventor: Philip Gillissen, Meerbusch (DE)

(73) Assignee: BAYER ANIMAL HEALTH GMBH, Leverkusen (DE)

( * ) Notice: Subject to any disclaimer, the term of this patent is extended or adjusted under 35 U.S.C. 154(b) by 64 days.

(21) Appl. No.: 18/893,647

(22) Filed: Sep. 23, 2024

(65) Prior Publication Data

US 2025/0014191 A1 Jan. 9, 2025

Related U.S. Application Data

(63) Continuation of application No. 17/440,732, filed as application No. PCT/EP2020/056688 on Mar. 12, 2020, now abandoned.

(30) Foreign Application Priority Data

Mar. 19, 2019 (EP) .................................... 19163648

(51) Int. Cl.

*G06V 40/10* (2022.01)
*G06T 5/70* (2024.01)
*G06T 7/215* (2017.01)
*G06T 7/254* (2017.01)

(52) U.S. Cl.

CPC ................ *G06T 7/215* (2017.01); *G06T 5/70* (2024.01); *G06T 7/254* (2017.01); *G06V 40/10* (2022.01)

(58) Field of Classification Search

CPC ........... G06T 7/215; G06T 7/20; G06T 7/254; G06T 5/70; G06V 40/10

See application file for complete search history.

(56) References Cited

U.S. PATENT DOCUMENTS 8,744,123 B2 6/2014 Bobbitt et al.
9,317,908 B2 4/2016 Seow et al.
10,846,863 B2 * 11/2020 Miyauchi ................ G06T 7/136
11,044,404 B1 * 6/2021 Persiantsev ........ H04N 23/6811
11,092,537 B2 * 8/2021 Arvis .................... G06T 7/0004
2014/0055560 A1 * 2/2014 Fu ............................. G06T 5/77 348/E13.001
2017/0192513 A1 * 7/2017 Karmon ................ G06V 40/28

(Continued)

FOREIGN PATENT DOCUMENTS

JP H07160891 A 6/1995
JP H0855234 A 2/1996

(Continued)

OTHER PUBLICATIONS

Office Action dated Apr. 25, 2025, issued in Japanese Patent Application No. 2024-074942, 5 pages.

(Continued)

*Primary Examiner* — Shaghayegh Azima
(74) *Attorney, Agent, or Firm* — QUARLES & BRADY LLP

(57) ABSTRACT

Systems and methods are provided that includes the processing of video material for reducing video material to temporal segments in which a significant movement of an object is recorded. The systems and methods may be used for the observation of animals.

11 Claims, 8 Drawing Sheets

(56) References Cited

U.S. PATENT DOCUMENTS

| | | | | |
|---|---|---|---|---|
| 2018/0268563 | A1* | 9/2018 | Chen | G06T 7/254 |
| 2018/0342070 | A1* | 11/2018 | Chen | G06V 20/52 |
| 2021/0181087 | A1* | 6/2021 | Arvis | G06T 7/0004 |

FOREIGN PATENT DOCUMENTS

| | | | |
|---|---|---|---|
| JP | H10289321 | A | 10/1998 |
| JP | 2000101987 | A | 4/2000 |
| JP | 2000101987 | A1 | 4/2000 |
| JP | 2008250674 | A | 10/2008 |
| RU | 2635066 | C2 | 11/2017 |

OTHER PUBLICATIONS

Kompatsiaris et al., Spatiotemporal Segmentation and Tracking of Objects for Visualization of Videoconference Image Sequences, IEEE Transactions on Circuits and Systems for Video Technology, 2000, 10(8):1388-1402.

Parks et al., Evaluation of Background Subtraction Algorithms with Post-Processing, IEEE Fifth International Conference on Advanced Video and Signal based Surveillance, 2008, pp. 1-8.

European Patent Office, Extended European Search Report, Application No. EP 19163648.9, Sep. 18, 2019, 9 pages [No English Language Translation Available].

PCT International Search Report and Written Opinion, PCT/EP2020/056688, Apr. 24, 2020, 22 pages.

* cited by examiner

| y \ x | 1 | 2 | 3 | 4 | 5 | 6 | 7 | 8 | 9 | 10 |
|---|---|---|---|---|---|---|---|---|---|---|
| 10 | 255 | 255 | 200 | 63 | 15 | 3 | 0 | 0 | 0 | 0 |
| 9 | 255 | 255 | 255 | 200 | 63 | 15 | 3 | 0 | 0 | 0 |
| 8 | 200 | 255 | 255 | 255 | 200 | 63 | 15 | 3 | 0 | 0 |
| 7 | 63 | 200 | 255 | 255 | 255 | 198 | 63 | 15 | 3 | 0 |
| 6 | 15 | 63 | 200 | 255 | 255 | 255 | 200 | 63 | 15 | 3 |
| 5 | 3 | 15 | 63 | 200 | 255 | 255 | 255 | 200 | 63 | 15 |
| 4 | 0 | 3 | 15 | 63 | 200 | 255 | 255 | 255 | 200 | 63 |
| 3 | 0 | 0 | 3 | 17 | 63 | 200 | 255 | 255 | 255 | 200 |
| 2 | 0 | 0 | 0 | 3 | 15 | 63 | 200 | 255 | 255 | 255 |
| 1 | 0 | 0 | 0 | 0 | 3 | 15 | 63 | 200 | 255 | 255 |

1-2

| | 1 | 2 | 3 | 4 | 5 |
|---|---|---|---|---|---|
| 5 | 197 | 240 | 192 | 55 | 55 |
| 4 | 63 | 197 | 240 | 192 | 55 |
| 3 | 15 | 63 | 197 | 238 | 192 |
| 2 | 3 | 17 | 63 | 197 | 240 |
| 1 | 0 | 3 | 15 | 63 | 197 |

2-3

| | 1 | 2 | 3 | 4 | 5 |
|---|---|---|---|---|---|
| 5 | 197 | 240 | 190 | 50 | 55 |
| 4 | 63 | 197 | 240 | 192 | 55 |
| 3 | 15 | 63 | 197 | 238 | 192 |
| 2 | 3 | 17 | 63 | 197 | 240 |
| 1 | 0 | 4 | 15 | 60 | 190 |

3-4

| | 1 | 2 | 3 | 4 | 5 |
|---|---|---|---|---|---|
| 5 | 187 | 220 | 190 | 55 | 50 |
| 4 | 63 | 197 | 240 | 192 | 55 |
| 3 | 15 | 63 | 197 | 238 | 192 |
| 2 | 3 | 17 | 63 | 197 | 240 |
| 1 | 0 | 0 | 15 | 65 | 195 |

1-2-3-4

| | 1 | 2 | 3 | 4 | 5 |
|---|---|---|---|---|---|
| 5 | 194 | 233 | 191 | 53 | 53 |
| 4 | 63 | 197 | 240 | 192 | 55 |
| 3 | 15 | 63 | 197 | 238 | 192 |
| 2 | 3 | 17 | 63 | 197 | 240 |
| 1 | 0 | 2 | 15 | 63 | 194 |

REDUCTION OF VIDEO MATERIAL TO MOTION SECTIONS

CROSS-REFERENCE TO RELATED APPLICATIONS

This application is a continuation of U.S. application Ser. No. 17/440,732, filed Sep. 17, 2021 and titled "REDUCTION OF VIDEO MATERIAL TO MOTION SECTIONS," and is a US national phase application of PCT/EP2020/056688, filed Mar. 12, 2020, which claims priority to EP patent application Ser. No. 19/163,648.9, filed Mar. 19, 2019, each of which is hereby incorporated by reference in its entirety.

BACKGROUND

The present invention is concerned with the processing of video material. Subjects of the present invention are a method, a device and a computer program product for reducing video material to temporal segments in which a significant movement of an object is recorded. A further subject of the present invention is the use of the device according to the invention in the observation of animals.

There are a large number of situations in which video material is generated in an automated manner and analyzed at a later point in time. One example concerns animal recordings in nature, involving setting up a camera which generates video recordings in an automated manner (without human assistance) in order to avoid wild animals being scared off by the presence of a human being. The video material is viewed and evaluated by a human being at a later point in time. A further example concerns the monitoring of property or a technical installation. A camera is directed at a property or a technical installation or the like and continuously generates video recordings. If an unauthorized person is trespassing on the property or damage arises at the technical installation, the video material can be viewed at a later point in time in order to be able to identify the unauthorized person or to ascertain the cause of the damage.

In many cases the video material generated comprises time segments that are not of interest, for example because no changes in the region observed by the corresponding camera have occurred in these time segments.

SUMMARY

The technical problem which is solved by the present invention consists in reducing video recordings of an object to those temporal segments in which a significant movement of the object is recorded.

This problem is solved by the subjects of the independent patent claims. Preferred embodiments are found in the dependent patent claims, in the present description and in the drawings.

A first subject of the present invention is a method for reducing video recordings to temporal segments in which one or more movements of an object above a motion threshold are recorded, comprising the following steps:

Receiving a temporal sequence of images,

Generating a sequence of difference images from the sequence of images, by generating a respective difference image for each pair of adjacent images of the temporal sequence of images, Generating a sequence of average-value difference images from the sequence of difference images, by a procedure in which, for all groups of successive difference images having a defined number of difference images, the difference images associated with a group are averaged in each case, Generating a sequence of binary images from the sequence of average-value difference images, Identifying groups of contiguous pixels in each binary image, Determining the size of each group of contiguous pixels in each binary image and comparing the respective size of a group with a threshold value, Identifying those binary images which have at least one group which is of a size equal to the threshold value or which is greater than the threshold value, Erasing all images of the temporal sequence of images which have not influenced the generation of a binary image identified in step g).

A further subject of the present invention is a device comprising an input unit, a control unit, a computing unit, and an output unit and/or a data storage unit, wherein the control unit is configured to cause the input unit to receive a sequence of images, wherein the control unit is configured to cause the computing unit to carry out the following steps:

Generating a sequence of difference images from the sequence of images, by generating a respective difference image for each pair of adjacent images of the temporal sequence of images, Generating a sequence of average-value difference images from the sequence of difference images, by a procedure in which, for all groups of successive difference images having a defined number of difference images, the difference images associated with a group are averaged in each case, Generating a sequence of binary images from the sequence of average-value difference images, Identifying groups of contiguous pixels in each binary image, Determining the sizes of the groups and comparing the respective size with a threshold value, Identifying those binary images which have at least one group which is of a size equal to the threshold value or which is greater than the threshold value, Erasing all images of the temporal sequence of images which have not influenced the generation of a binary image identified in step f), wherein a reduced sequence of images arises, wherein the control unit is configured to store the reduced sequence of images in the data storage unit and/or to cause the output unit to output the reduced sequence of images.

A further subject of the present invention is the use of the device according to the invention in the observation of animals.

A further subject of the present invention is a computer program product comprising a data carrier, on which a computer program is stored, which can be loaded into the main memory of a computer and there causes the computer to perform the following steps:

Receiving a temporal sequence of images,

Generating a sequence of difference images from the sequence of images, by generating a respective difference image for each pair of adjacent images of the temporal sequence of images, Generating a sequence of average-value difference images from the sequence of difference images, by a procedure in which, for all groups of successive difference images having a defined number of difference images, the difference images associated with a group are averaged in each case, Generating a sequence of binary images from the sequence of average-value difference images, Identifying groups of contiguous pixels in each binary image, Determining the sizes of the groups of contiguous pixels and comparing the respective size of a group with a threshold value, Identifying those binary images which have at least one group which is of a size equal to the threshold value or which is greater than the threshold value, Erasing all images of the temporal sequence of images which have not influenced the generation of a binary image identified in step g), wherein a reduced sequence of images arises, Storing the reduced sequence of images in a data storage unit and/or outputting the reduced sequence of images on a monitor.

The invention is explained in greater detail below without distinguishing between the subjects of the invention (method, device, computer program product, use). Rather, the explanations below are intended to apply to all subjects of the invention in an analogous way, irrespective of the context in which they are given.

The present invention makes it possible to reduce video recordings in an automated manner to temporal segments in which a movement of an object above a freely definable motion threshold is recorded.

An object within the meaning of the present invention is any article or any living organism which can move (autonomously). With preference, the object is a living organism in the form of an animal, preferably an experimental animal, most preferably a dog.

A movement is any change over time in the position or the size of an object or of part of the object. A movement can be locomotion of the object from one location to another location. A movement can be the raising or lowering or sideward movement of part of an object, such as, for example, the raising or lowering or sideward movement of a limb of a living organism. In one preferred embodiment, the movement is shaking of the body of a living organism or of part of the body of the living organism, activities of a living organism concerning its own body care, and/or licking, chewing, scratching and/or rubbing of a living organism.

The starting point for the application of the present invention is video material that shows an object over a defined time period. It is also conceivable for the video material to show a plurality of objects. It is furthermore conceivable that the video material can at least in part also show no object at all.

Video material usually consists of a sequence of frames or can be converted into such a sequence of frames. In the present description, the video material or the sequence of frames is referred to as a (temporal) sequence of images. An image is a snapshot of an event. The images of the sequence of images are subjected to a series of operations in the implementation of the present invention. The images of the sequence of images are also referred to as original images in this description, since they are the starting point for the implementation of the present invention.

The video material that is reducible by means of the present invention is usually present in digital form or can be brought into such a digital form. A frame (image) is accordingly a digital image recording of a moment.

Digital video material has a defined frame frequency (also referred to as frame rate). The frame frequency denotes the number of frames that are recorded or reproduced per time period and is usually specified in the unit fps (standing for: frames per second) or Hz. A customary range is 10 Hz to 240 Hz. The frame frequency is preferably 20 to 40 Hz.

A point in time is assigned to each image or a point in time can be assigned to each image. This point in time is usually the point in time at which the image was generated (absolute time). It is known to the person skilled in the art that the generation of an image recording takes a certain time period. An image can be assigned e.g. the point in time of the beginning of the recording of the image or the point in time of the completion of the image recording. However, it is also conceivable for the images of the temporal sequence to be assigned arbitrary points in time (e.g. relative points in time).

On the basis of a point in time, one image can be classified temporally in relation to another image; on the basis of the point in time of one image, it is possible to establish whether the moment shown in the image took place temporally before or temporally after a moment shown in another image. The point in time assigned to an image is also referred to as a time stamp in this description. The time stamp can contain information about the year, the month, the day, the hour, the minute, the second, the tenth of a second and/or the hundredth of a second at which the moment shown took place.

However it is also conceivable for a first image of the temporal sequence of images to be arbitrarily assigned a point in time 0 and for the temporally succeeding images to be assigned that time period which has elapsed since the point in time 0. If a first image is assigned a first point in time and a second image, temporally directly following the first image, is assigned a second point in time, then the reciprocal of the time period between the first point in time and the second point in time usually corresponds to the frame frequency of the present video material.

In addition to or instead of a point in time, each image can be provided with a unique identifier, on the basis of which the image can be identified and distinguished from other images. It is conceivable, for example, for the images of the sequence of images to be (additionally) numbered consecutively. The first image of the sequence of images acquires e.g. the numeral 1, the image directly temporally following the first image acquires the numeral 2, and so on.

Digital images can be present in various formats. Digital images can be coded as raster graphics, for example. Raster graphics consist of a raster-type arrangement of so-called pixels, each of which is assigned a color. The main features of raster graphics are therefore the image size (width and height measured in pixels, also referred to colloquially as image resolution) and the color depth.

A pixel of a digital image is usually assigned a color. The coding of the color used for a pixel is defined, inter alia, by way of the color space and the color depth. The simplest case is a binary image, in which a pixel stores a black-and-white value. In the case of an image whose color is defined by way of the so-called RGB color space (RGB stands for the primary colors Red, Green and Blue), each pixel consists of three subpixels, one subpixel for the color red, one subpixel for the color green and one subpixel for the color blue. The color of a pixel results from the superposition (additive mixing) of the color values of the subpixels. The color value of a subpixel is subdivided into 256 color shades, which are referred to as tonal values and range from 0 to 255. The color shade "0" of each color channel is the darkest. If all three channels have the tonal value 0, the corresponding pixel appears black; if all three channels have the tonal value 255, the corresponding pixel appears white.

In the implementation of the present invention, digital image recordings are subjected to specific operations. In this case, the operations predominantly concern the pixels or the tonal values of the individual pixels. There are a large number of possible digital image formats and color codings. For simplification, it is assumed in this description that the images present are greyscale raster graphics having a specific number of pixels, wherein each pixel is assigned a tonal value indicating the greyscale value of the image. However, this assumption ought not to be understood as limiting in any way. It is clear to the person skilled in the art of image processing how this person can apply the teaching of this description to images which are present in other image formats and/or in which the color values are coded differently.

In a first step, a sequence of difference images is generated from the sequence of images present. A respective difference image is generated for each pair of adjacent images. Two images are adjacent if, in the sequence present, they are temporally directly successive without there being an image which intervenes temporally between the two images. If a sequence of five images is present, for example,

- a first difference image is generated from the first and the second images,
- a second difference image is generated from the second and third images,
- a third difference image is generated from the third and fourth images, and
- a fourth difference image is generated from the fourth and fifth images.

A difference image usually has exactly the same number of pixels as each of the images from which it has been generated.

A difference image is generated by a procedure in which, for each pixel of an image, the tonal value of the pixel is subtracted from the tonal value of the corresponding pixel of the adjacent image and the absolute value is generated from the result of the subtraction in order to avoid negative tonal values.

Two pixels correspond to one another if they have the same coordinates (in the representation as raster graphics).

The result is a sequence of difference images, wherein each difference image comprises a number of pixels, wherein a tonal value is assigned to each pixel. If no changes occur from one image to an adjacent image, then the tonal values of the pixels of said one image correspond to the tonal values of the pixels of the adjacent image. The subtraction yields the tonal value 0 (zero) (if no noise is present) for each pixel of the difference image. In a greyscale representation, the difference image is black. A black difference image indicates that there was no change in the recorded scene from one image to the adjacent image.

By contrast, if changes occur in the recorded scene from image to an adjacent image, then these changes become apparent in pixels having tonal values different than zero.

Preferably, the difference images are provided with an identifier allowing a conclusion to be drawn about the images which influenced the generation of a difference image. If the images are numbered consecutively, for example, and bear the numbers 1, 2, 3, etc., the difference image can bear an identifier that includes the digits of the associated images. For example, a difference image which was generated from the image having the digit 1 and the image having the digit 2 can contain an identifier 1-2.

It is also conceivable for a difference image produced from the subtraction of a first image from a second image to be assigned the point in time assigned to the first image and/or to be assigned to the point in time assigned to the second image and/or be assigned a point in time intervening temporally between the point in time assigned to the first image and the point in time assigned to the second image. The points in time assigned to the difference images are preferably defined such that the reciprocal of the time period between the points in time of two directly successive difference images corresponds to the frame frequency of the video material present.

In a next step, a sequence of average-value difference images is generated from the sequence of difference images. The generation of each average-value difference image is influenced by a defined number of difference images, which is designated here as N. N is a natural integer that is greater than 1. Each average-value difference image is generated from the number N of temporally directly successive difference images. For this purpose, firstly a time window is defined. The time window is a virtual time window. It defines a time period of defined length. The length of the time period is N times the time period between two directly successive difference images. Accordingly, the time window can accommodate exactly N difference images. For the purpose of averaging, the time window is shifted image by image along the sequence of difference images, and at each position of the time window an average-value image is generated from the difference images contained in the time window. At the beginning of the averaging, the time window is positioned at the start of the sequence of difference images. At this position the time window contains the first N difference images (1 to N). An average-value image is generated from these first N difference images. Afterward, the time window is shifted one difference image further. It now contains the difference images 2 bis (N+1). An average-value image is generated from the difference images 2 bis (N+1). The time window is then advanced once again by one difference image. It now contains the difference images 3 bis (N+2). An average-value image is generated from the difference images 3 bis (N+2). Finally, the time window is advanced once again by one difference image, and so on.

An average-value image usually has exactly the same number of pixels as each of the difference images from which it has been generated.

During the generation of each average-value image, the average values of the tonal values of corresponding pixels of the difference images are formed and set as tonal values of the pixels of the average-value image. The average values can be arithmetic means or geometric means or root mean squares or other average values. The arithmetic means are preferably formed. The result is a sequence of average-value images having a number of pixels, wherein each pixel is assigned a tonal value, wherein the tonal value is an average value of the tonal values of N difference images. Since the average-value images are generated from difference images, they are also referred to as average-value difference images in this description.

The number N of difference images over which averaging is effected, and from which an average-value difference image is generated in each case, can be for example in the range of 2 to 10 000 or in the range of 5 to 1 000 or in the range of 10 to 100 or the like. The number can depend on the object, on the frame rate, on the resolution, on the scene and/or the like. It is possible to determine empirically what number yields optimum results for a specific application, by trying out different numbers and comparing the results. A good result reduces the video material present to the temporal segments in which the respective movements of interest are captured, while the segments cut out contain no movements of interest. In the case of a bad result, segments that are of interest are cut out and/or the reduced video material comprises segments that are not of interest.

Each average-value difference image is preferably assigned a point in time. This can be e.g. the point in time assigned to that difference image which forms the start of the respective time window (the first difference image in the series of N difference images of a time window over which averaging is effected). It can also be the point in time assigned to that difference image which forms the end of a respective time window (the last difference image in the series of N difference images of a time window over which averaging is effected). It can also be an average (e.g. arithmetically averaged) point in time.

Preferably, each average-value difference image is provided with an identifier allowing a conclusion to be drawn about the difference images and/or the images which influenced the formation of the average-value difference image. If the images are numbered consecutively, for example, and bear the numbers 1, 2, 3, 4, etc. and if the difference images are provided with a corresponding identifier such as, for example, 1-2, 2-3, 3-4 etc., and if an average-value difference image has been generated from the difference images 1-2, 2-3 and 3-4, the average-value difference image can bear the identifier 1-2-3-4.

In one preferred embodiment, in a next step for suppressing noise in the average-value difference images the contrast of the average-value difference images is reduced. The contrast is preferably reduced by blur, e.g. by applying a Gaussian blur.

A Gaussian blur uses a Gaussian filter to smooth image contents. The filter results in a reduction of image noise and causes smaller structures to disappear in order to obtain coarser regions. A Gaussian blur acts on each pixel of an average-value difference image and sets its tonal value to a weighted average value of the tonal values of all pixels that lie in a defined radius with respect to the pixel under consideration. The weighting is effected on the basis of the Gaussian normal distribution. Gaussian blurs are known to the person skilled in the art of digital image processing (see e.g. William K. Pratt: Introduction to Digital Image Processing, CRC Press, 2013, ISBN: 978-1-4822-1670-7) and they are implemented in many image processing software programs. Parameters that have to be predefined for the application of a Gaussian blur are the standard deviation of the Gaussian function (sigma) and the size of the radius or the size of the matrix of pixels which are intended to be taken into account in the weighted averaging (kernel). Adequate parameter values can be determined empirically. Examples are parameter values are sigma=0.5 or sigma=1 and kernel=3×3 or kernel=5×5.

The result of the contrast reduction is a sequence of contrast-reduced average-value difference images.

Each contrast-reduced average-value difference image is preferably assigned the point in time of the corresponding average-value difference image from which it was generated.

If the average-value difference images have a unique identifier, then the contrast-reduced average-value difference images preferably likewise have a unique identifier. The unique identifiers of the contrast-reduced average-value difference images can comprise for example the unique identifiers of the corresponding average-value difference images from which they were generated.

A contrast-reduced average-value difference image usually has exactly the same number of pixels as the average-value difference image from which it was generated.

In a further step, the average-value difference images or the contrast-reduced average-value difference images are binarized. That means that each pixel of an average-value difference image is assigned one of two tonal values-a first tonal value or a second tonal value. The first tonal value can have the value 0 (black) for example and the second tonal value can have the value 255 (white) for example. The assignment is effected on the basis of the existing tonal value of a pixel and on the basis of a tonal-value threshold value. If the tonal value of a pixel is less than the tonal-value threshold value, then the tonal value of the pixel is set to the first tonal value; if the tonal value of the pixel is greater than the tonal-value threshold value or the tonal value of the pixel corresponds to the tonal-value threshold value, then the tonal value of the pixel is set to the second tonal value.

An adequate tonal-value threshold value can be determined empirically. Examples of tonal-value threshold values (in the case of a tonal value range of 0 to 255) are 10 or 20 or 30 or 50.

The result of the binarization is a sequence of binarized average-value difference images, which are also referred to as binary images in this description.

Each binary image is preferably assigned a point in time. The point in time of a binary image preferably corresponds to the point in time assigned to that (contrast-reduced) average-value difference image from which the binary image was generated.

If the average-value difference images have a unique identifier, then the binary images preferably likewise have a unique identifier. The unique identifiers of the binary images can comprise for example the unique identifiers of the corresponding (contrast-reduced) average-value difference images.

A binary image usually has exactly the same number of pixels as the (contrast-reduced) average-value difference image from which it was generated.

In one preferred embodiment, in a further step, those pixels of the binary images which have the second tonal value are expanded (dilated) singly or multiply to the shape of a defined structuring element.

In one preferred embodiment, the structuring element is an (n×m) matrix of pixels having the second tonal value. That means that a pixel having a second tonal value is expanded to an (n×m) matrix of pixels having a second tonal value.

In one particularly preferred embodiment, a (3×3)-matrix is involved. Particularly preferably, such a dilatation operator is applied twice in succession.

The result of such a single or multiple dilatation is a sequence of dilated binary images.

Each dilated binary image is preferably assigned a point in time. The point in time of a dilated binary image preferably corresponds to the point in time assigned to that binary image from which the dilated binary image was generated.

If the binary images have a unique identifier, then the dilated binary images preferably likewise have a unique identifier. The unique identifiers of the dilated binary images can comprise for example the unique identifiers of the corresponding binary images.

A dilated binary image usually has exactly the same number of pixels as the binary image from which it was generated.

In a next step, in each (dilated) binary image of the sequence of binary images, groups of contiguous pixels which have the second tonal value are identified and the respective sizes of these groups are ascertained.

In raster graphics, the pixels in the four corners of the raster graphics have in each case three directly adjacent pixels, the pixels at the edges of the raster graphics in each case have five directly adjacent pixels, and the rest of the pixels of the raster graphics have in each case eight directly adjacent pixels. Contiguous pixels having the second tonal value are all those pixels whose tonal value corresponds to the second tonal value and which have at least one directly adjacent pixel whose tonal value likewise corresponds to the second tonal value.

The size of a group can be ascertained and specified by way of the number of pixels having a second tonal value which belong to the group.

It is also conceivable for the size of a group to be ascertained and specified by way of the area taken up by this group.

In one preferred embodiment, the size of a group is ascertained by way of the number of pixels in a bounding border that bounds groups of contiguous pixels having a second tonal value.

In this preferred embodiment, groups of contiguous pixels having the second tonal value are bounded by a bounding border, wherein the bounding border is chosen such that it satisfies all the following criteria:

- the bounding border is rectangular,
- its edges run parallel to the edges of the binary image,
- all pixels which have the same tonal value and which belong to a group of contiguous pixels lie within the bounding border,
- the bounding border comprises as few pixels as possible which do not belong to the group of contiguous pixels having the second tonal value.

The sizes of the groups of contiguous pixels having the second tonal value are compared in each case with a group threshold value. If binary images have exclusively pixels having a first tonal value, no corresponding groups are present. If a binary image includes at least one group which is of a size exactly equal to the group threshold value or which is greater than the group threshold value, then the corresponding binary image indicates a movement above a motion threshold. If a binary image includes only one or a plurality of groups smaller than the group threshold value, then the corresponding binary image indicates no movement above a motion threshold. Binary images that indicate no movement above a motion threshold are of no interest for further evaluation.

Accordingly, it is necessary to identify those (dilated) binary images which have at least one group which is of a size equal to the group threshold value or which is greater than the threshold value, and to erase those images of the temporal sequence of images which did not influence the generation of such an identified (dilated) binary image.

Images of the sequence of images which influenced the generation of (dilated) binary images can be identified for example on the basis of a unique identifier of the (dilated) binary images if the unique identifier permits conclusions to be drawn about the original images (e.g. because the unique identifier of the binary images comprises the unique identifier of the original images).

Those images of the sequence of images which influenced the generation of (dilated) binary images can also be identified for example on the basis of the points in time assigned to the (dilated) binary images.

The invention can be implemented with the aid of a device. This device according to the invention comprises an input unit, a control unit, a computing unit, an output unit and/or a data storage unit.

Preferably, the device according to the invention is a computer; it is also conceivable for the device according to the invention to comprise a plurality of computers.

A "computer" is a device for electronic data processing which processes data by means of programmable computation rules. Such a device usually comprises a motherboard, that unit which comprises a processor for carrying out logic operations, and also peripherals.

In computer technology, "peripherals" denotes all devices which are connected to the computer and serve for control of the computer and/or as input and output units. Examples are monitor (screen), printer, scanner, mouse, keyboard, drives, camera, microphone, loudspeakers, etc. Internal connections and expansion cards are also deemed to be peripherals in computer technology.

Present-day computers are often subdivided into desktop PCs, portable PCs, laptops, notebooks, netbooks and tablet PCs and so-called handhelds (e.g. smartphone). The invention can be implemented with all these computers.

The control unit and the computing unit of the device according to the invention can be for example one or more processors in conjunction with one or more main memories. The input unit can be a (wireless and/or wired) connection to a network or a serial connection (e.g. USB) or the like, via which video material can be transmitted from a camera to the device. The video material is usually stored on a data storage unit (e.g. a hard disk). The input unit can also be used by a user of the device according to the invention in order to effect inputs via a keyboard, a mouse, a microphone, a touchscreen or the like (e.g. the input of one or more threshold values, the number N or the like).

The result of the processing of the video material according to the invention (the reduced sequence of images) can be stored on the data storage unit (e.g. the hard disk) or output on a monitor.

BRIEF DESCRIPTION OF THE DRAWINGS

The invention is explained in greater detail below using figures, without any intention for the invention to be restricted to the features and feature combinations shown in the figures.

Figures 1, 2:
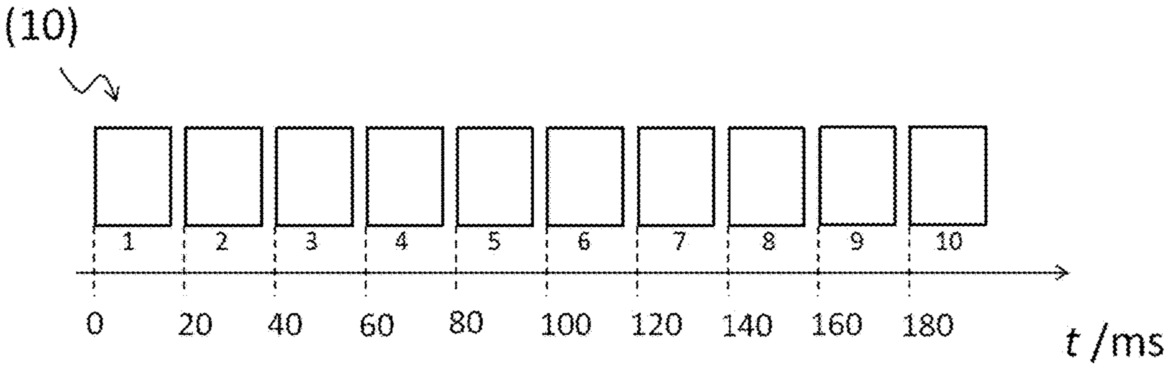
FIG. 1 shows a sequence of images schematically and by way of example. The sequence (10) comprises 10 images. The images have a unique identifier: they are numbered consecutively from 1 to 10. Each image of the sequence (10) of images is assigned a point in time. The image having the unique identifier 1 is assigned the point in time 0. The image having the unique identifier 2 is assigned the point in time 20 ms (milliseconds). The image having the unique identifier 3 is assigned the point in time 40 ms. The image having the unique identifier 4 is assigned the point in time 60 ms, and so on. The temporal separation between two images is thus 20 ms. The frame frequency is accordingly 50 frames per second in the present example.
FIG. 2 shows an image in the form of greyscale raster graphics schematically and by way of example. The raster graphics consist of 10×10=100 pixels. Each pixel can be uniquely addressed on the basis of an x-coordinate and a y-coordinate. Each pixel is assigned a tonal value. The tonal value can specify a greyscale level, for example. In this regard, it is conceivable for each pixel in FIG. 2 to be assigned one of 256 greyscale levels, wherein the tonal value 0 denotes the color tone (the greyscale level) "black" and the tonal value 255 denotes the color tone (the greyscale level) "white", and the remaining tonal values specify greyscale levels between "black" and "white". In this regard, in the present example, the pixel having the x,y-coordinates 4,3 has a tonal value of 17, for example, and the pixel having the x,y-coordinates 6,7 has a tonal value of 198, for example.
Figure 3:
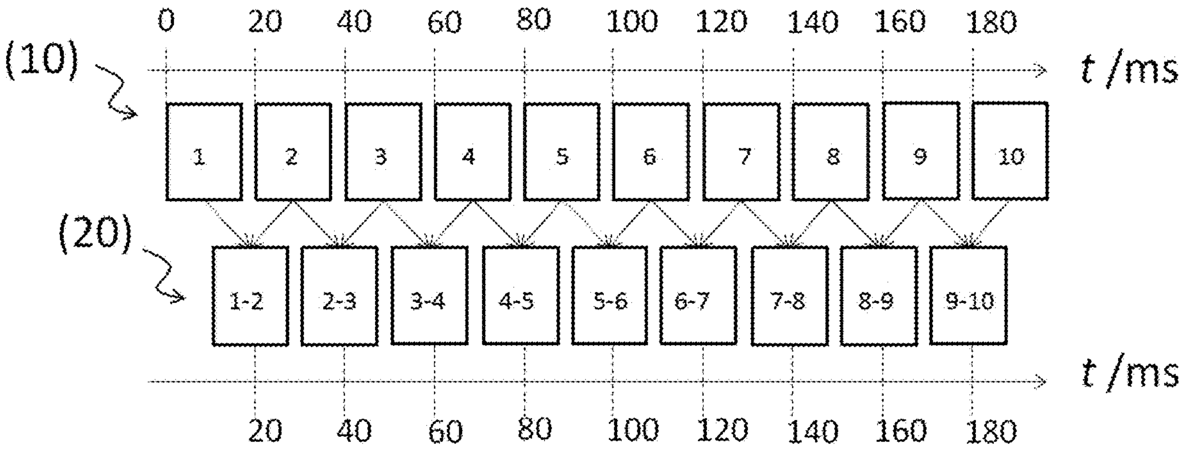
FIG. 3 shows by way of example and schematically how a sequence (20) of 9 difference images having the unique identifiers 1-2, 2-3, 3-4, 4-5, 5-6, 6-7, 7-8-, 8-9 and 9-10 is generated from a sequence (10) of 10 images having the unique identifiers 1, 2, 3, 4, 5, 6, 7, 8, 9 and 10.

The difference images are generated from pairs of temporally directly successive images: a first difference image 1-2 is generated from the images having the identifiers 1 and 2, a second difference image 2-3 is generated from the images having the identifiers 2 and 3, and so on. The unique identifier of a difference image thus yields conclusions drawn from the images from which it was generated.

Each difference image is assigned a point in time. The difference image having the identifier 1-2 is assigned the point in time 20 ms, the difference image having the identifier 2-3 is assigned the point in time 40 ms, and so on. The frame frequency of the sequence (20) of difference images corresponds to the frame frequency of the sequence (10) of difference images; it is 50 frames per second.

Figure 4:
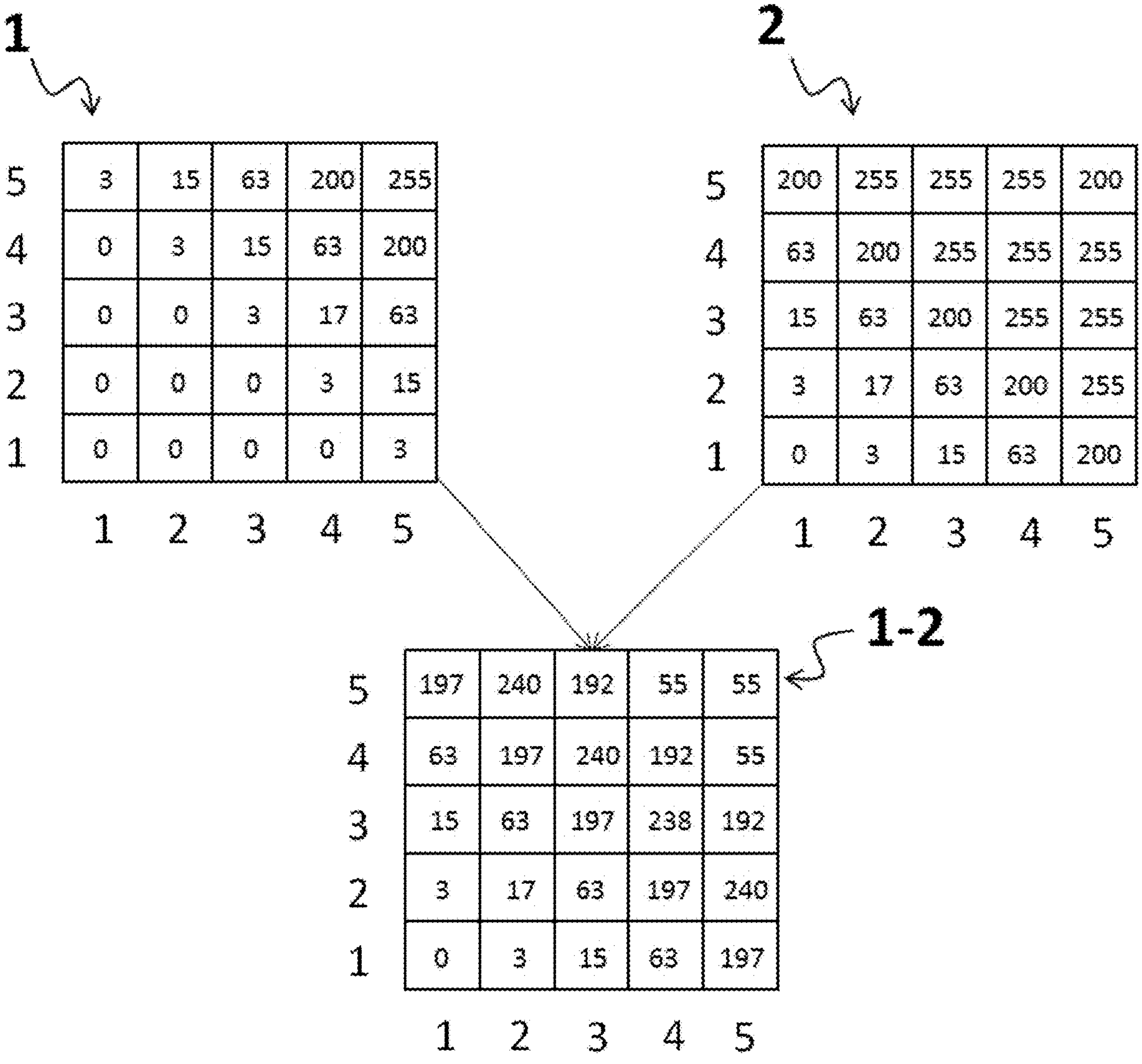

FIG. 4 shows by way of example and schematically how a difference image having the identifier 1-2 is generated from an image having the identifier 1 and an image having the identifier 2, temporally directly succeeding the image having the identifier 1.

The image having the identifier 1, the image having the identifier 2 and the difference image having the identifier 1-2 each consist of 5×5=25 pixels. Each pixel is uniquely addressable by coordinates. Each pixel is assigned a tonal value. During the generation of the difference image, the absolute value of the difference in the tonal value of a pixel and of the corresponding pixel of the directly succeeding image is calculated and set as the tonal value of the corresponding pixel of the difference image. Pixels correspond to one another if they have the same coordinates. The tonal value $T^{1-2}$ (4,3) of the pixel having the coordinates 4,3 of the difference image 1-2 results for example from the tonal value $T^1$ (4,3) of the pixel having the coordinates 4,3 of the image having the identifier 1 and the tonal value $T^2$ (4,3) of the pixel having the coordinates 4,3 of the image having the identifier 2:

$$T^{1-2}(4,3)=\left|T^1(4,3)-T^2(4,3)\right|=|17-255|=|-238|=238$$

Generally it holds true that: $T^{n-(n+1)}(x,y)=|T^n(x,y)-T^{(n+1)}(x,y)|$ wherein n and (n+1) represent the unique identifiers of two directly successive images, n−(n+1) represents the unique identifier of the difference image, and x,y represent the coordinates of the pixels corresponding to one another.

Figures 5, 6:
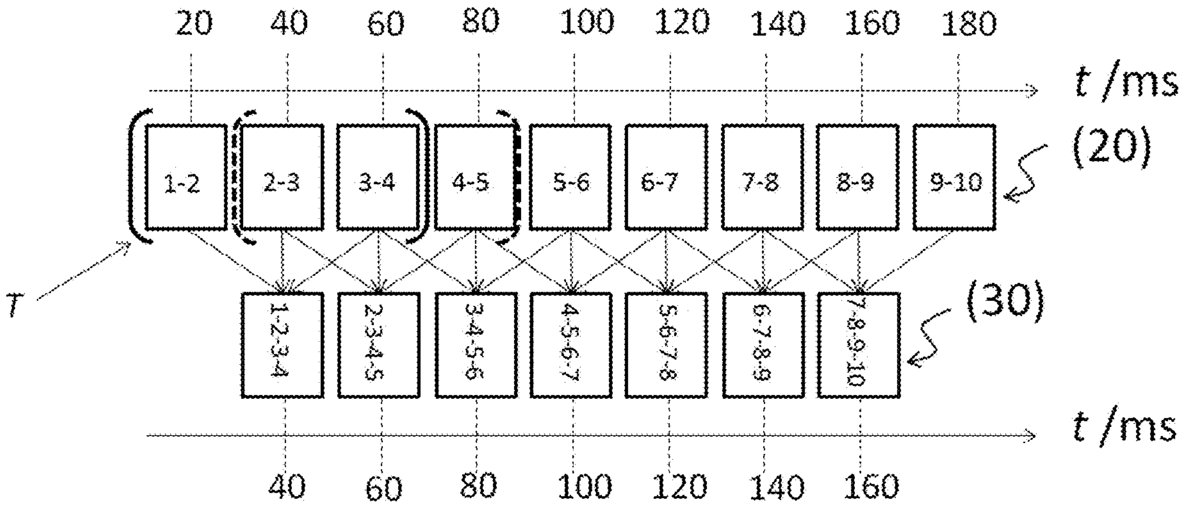

FIG. 5 shows by way of example and schematically how a sequence (30) of average-value difference images having the unique identifiers 1-2-3-4, 2-3-4-5, 3-4-5-6, 4-5-6-7, 5-6-7-8, 6-7-8-9 and 7-8-9-10 is generated from a sequence (20) of difference images having the unique identifiers 1-2, 2-3, 3-4, 4-5, 5-6, 6-7, 7-8, 8-9 and 9-10.

Each average-value difference image is assigned a point in time. The average-value difference image having the identifier 1-2-3-4 is assigned the point in time 40 ms, the difference image having the identifier 2-3-4-5 is assigned the point in time 60 ms, and so on. The frame frequency of the sequence (30) of average-value difference images corresponds to the frame frequency of the sequence (20) of difference images; it is 50 frames per second.

A time window T represented by a pair of brackets is depicted in FIG. 5. The time window T has a length of 60 ms. It can therefore accommodate three directly successive difference images.

At the beginning the time window Tis set to the start of the sequence (20) of difference images. A first average-value difference image is generated from the difference images encompassed by the time window: these are the difference images having the identifiers 1-2, 2-3 and 3-4. In a next step, the time window T is shifted toward the right by one difference image. Now (see the dashed pair of brackets) the time window encompasses the difference images having the identifiers 2-3, 3-4 and 4-5. A second average-value difference image is generated from these difference images. Afterward, the time window is again shifted toward the right by one difference image and a third average-value difference image is generated from the difference images then encompassed by the time window. The process is continued (shifting the time window image by image, generating an average-value difference image from the difference images encompassed by the time window) until all difference images have influenced a generation of an average-value difference image at least once.

FIG. 6 shows by way of example and schematically how an average-value difference image having the identifier 1-2-3-4 is generated from a difference image having the identifier 1-2, a difference image having the identifier 2-3, directly succeeding the difference image having the identifier 1-2, and a difference image having the identifier 3-4, directly succeeding the difference image having the identifier 2-3.

The difference image having the identifier 1-2, the difference image having the identifier 2-3, the difference image having the identifier 3-4 and the average-value difference image having the identifier 1-2-3-4 each consist of 5×5=25 pixels. Each pixel is uniquely addressable by coordinates. Each pixel is assigned a tonal value. During the generation, for each pixel of the average-value difference image the arithmetic mean—rounded to an integer—of the tonal values of the corresponding pixels of the difference images is calculated and set as the tonal value of the pixel of the average-value difference image. Pixels correspond to one another if they have the same coordinates. Rounding can involve always rounding up to the nearest integer or always rounding down to the nearest integer or defining a threshold value at which rounding up or down commences.

In the present example, the tonal value $T^{1-2-3-4}(3,5)$ of the pixel having the coordinates 3,5 of the average-value difference image 1-2-3-4 results from the tonal value $T^{1-2}(3,5)$ of the pixel having the coordinates 3,5 of the difference image having the identifier 1-2 and the tonal value $T^{2-3}(3,5)$ of the pixel having the coordinates 3,5 of the difference image having the identifier 2-3 and the tonal value $T^{3-4}(3,5)$ of the pixel having the coordinates 3,5 of the difference image having the identifier 3-4:

$$T^{1-2-3-4}(3,5) = \mathrm{INT}\left[\left(T^{1-2}(3,5) + T^{2-3}(3,5) + T^{3-4}(3,5)\right)/3\right] = \mathrm{INT}\left[(192+190+190)/3\right] = \mathrm{INT}\left[190.\overline{6}\right] = 191.$$

The function INT[ ] rounds a non-integer up or down to the nearest integer (depending on which value is nearer); rounding up is effected in the middle (0.5).

Generally it holds true that: $T^{n-(n+1)-(n+2)-(n+3)}(x,y)=\mathrm{INT}[(T^{n}(x,y)+T^{(n+1)}(x,y)+T^{(n+2)}(x,y))/3]$ In the example shown in FIGS. 5 and 6, the average-value difference images were generated from three directly successive difference images in each case. It is conceivable, of course, to generate the average-value difference images from a different number of directly successive difference images. The number N of difference images over which averaging is effected is usually greater than 3.

Figure 7:
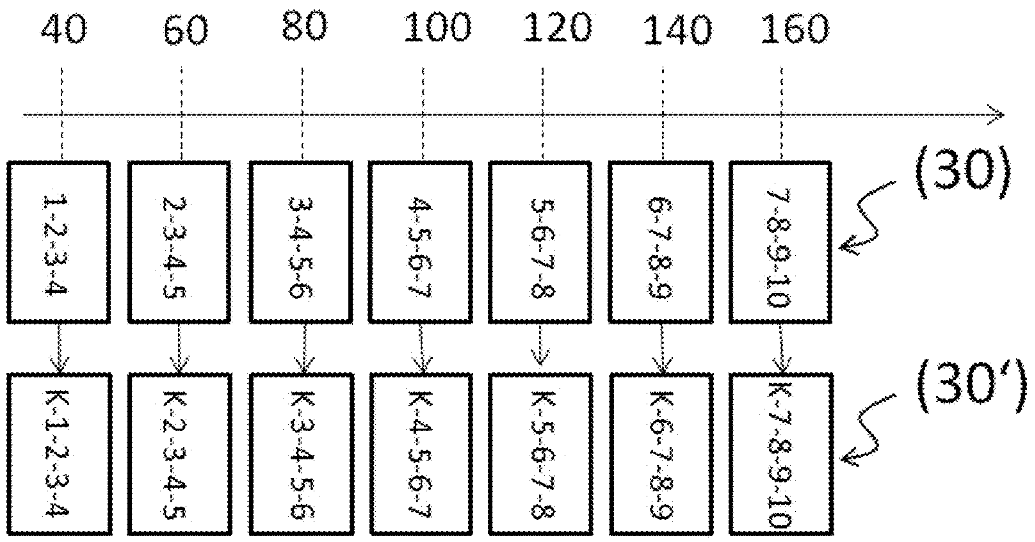

FIG. 7 shows by way of example and schematically how a sequence (30') of contrast-reduced average-value difference images having the unique identifiers K-1-2-3-4, K-2-3-4-5, K-3-4-5-6, K-4-5-6-7, K-5-6-7-8, K-6-7-8-9 and K-7-8-9-10 is generated from a sequence (30) of average-value difference images having the unique identifiers 1-2-3-4, 2-3-4-5, 3-4-5-6, 4-5-6-7, 5-6-7-8, 6-7-8-9 and 7-8-9-10.

Each contrast-reduced average-value difference image is assigned a point in time. The contrast-reduced average-value difference image having the identifier K-1-2-3-4 is assigned the point in time 40 ms, the contrast-reduced average-value difference image having the identifier K-2-3-4-5 is assigned the point in time 60 ms, and so on. The frame frequency of the sequence (30') of contrast-reduced average-value difference images corresponds to the frame frequency of the sequence (30) of average-value difference images; it is 50 frames per second.

Figure 8:
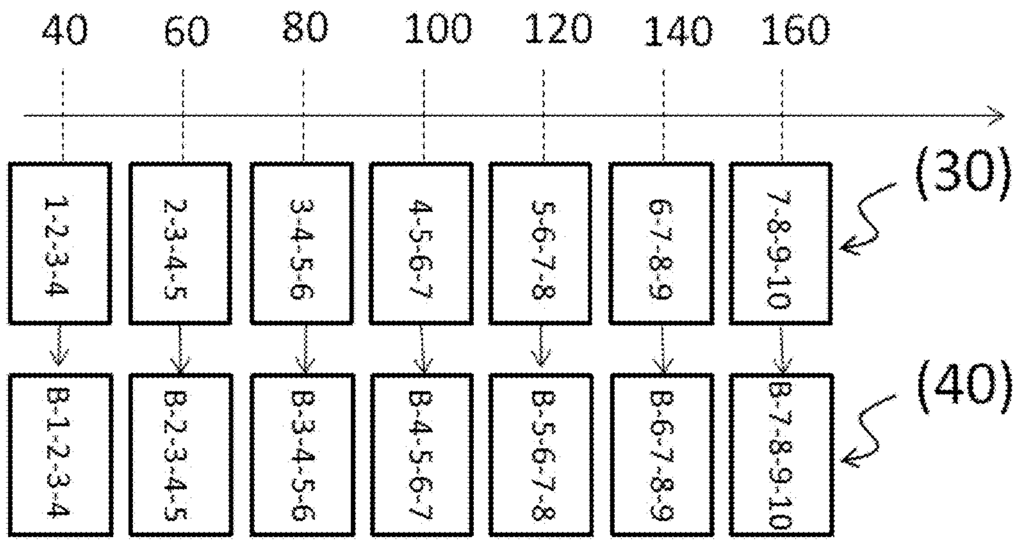

FIG. 8 shows by way of example and schematically how a sequence (40) of binary images having the unique identifiers B-1-2-3-4, B-2-3-4-5, B-3-4-5-6, B-4-5-6-7, B-5-6-7-8, B-6-7-8-9 and B-7-8-9-10 is generated from a sequence (30) of average-value difference images having the unique identifiers 1-2-3-4, 2-3-4-5, 3-4-5-6, 4-5-6-7, 5-6-7-8, 6-7-8-9 and 7-8-9-10.

Each binary image is assigned a point in time. The binary image having the identifier B-1-2-3-4 is assigned the point in time 40 ms, the binary image having the identifier B-2-3-4-5 is assigned the point in time 60 ms, and so on. The frame frequency of the sequence (40) of binary images corresponds to the frame frequency of the sequence (30) of average-value difference images; it is 50 frames per second.

It is likewise conceivable for a sequence of binary images having the unique identifiers B-1-2-3-4, B-2-3-4-5, B-3-4-5-6, B-4-5-6-7, B-5-6-7-8, B-6-7-8-9 and B-7-8-9-10 to be generated from a sequence of contrast-reduced average-value difference images having the unique identifiers K-1-2-3-4, K-2-3-4-5, K-3-4-5-6, K-4-5-6-7, K-5-6-7-8, K-6-7-8-9 and K-7-8-9-10.

Figure 9:
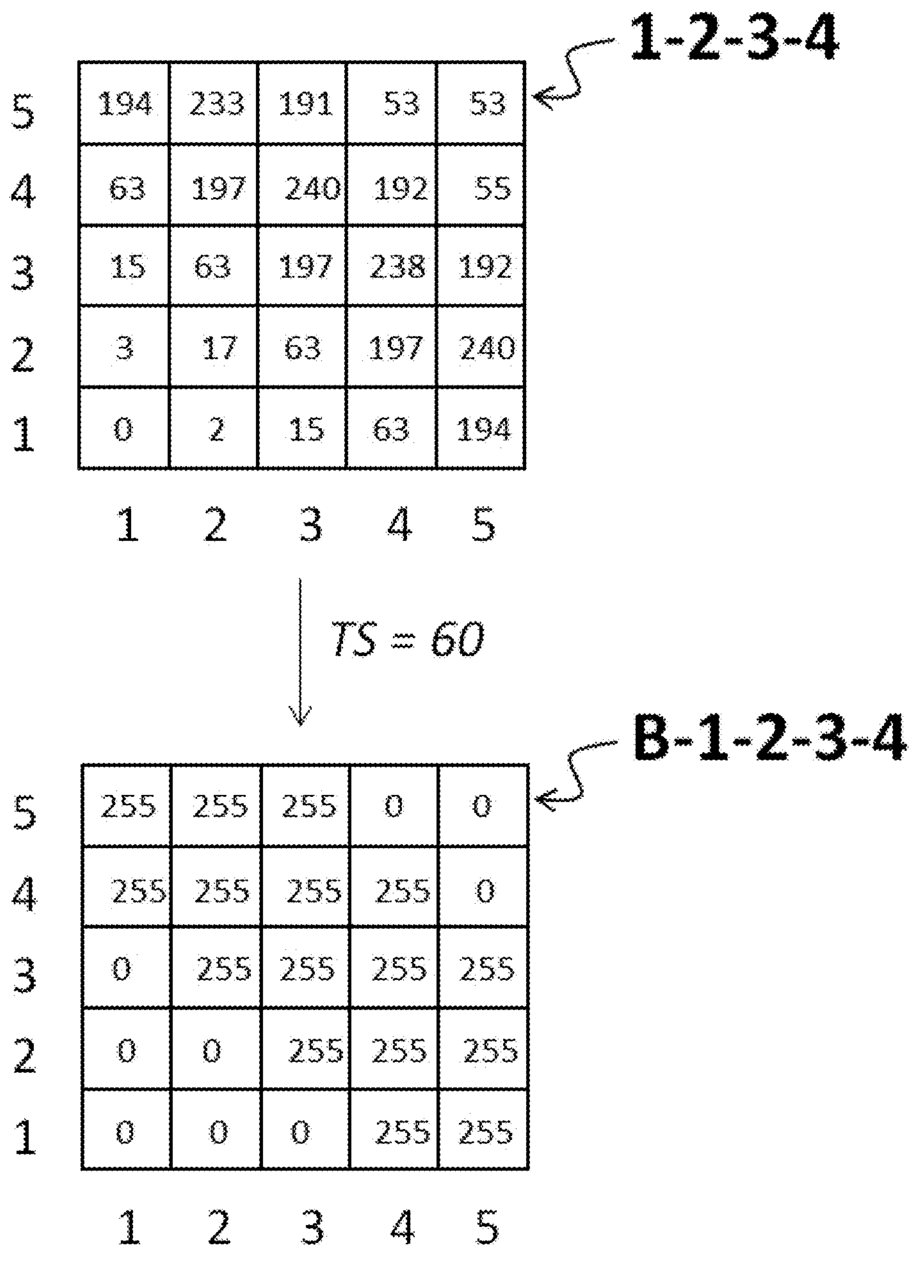

FIG. 9 shows by way of example and schematically how a binary image having the unique identifier B-1-2-3-4 is generated from an average-value difference image having the unique identifier 1-2-3-4.

The average-value difference image having the identifier 1-2-3-4 and the binary image having the identifier B-1-2-3-4 each consist of 5×5=25 pixels. Each pixel is uniquely addressable by coordinates. Each pixel is assigned a tonal value. During the generation of the binary image, the tonal value of each pixel of the average-value difference image is compared with a tonal-value threshold value TS. If the tonal value of a pixel is less than the tonal-value threshold value TS, then the tonal value of the pixel is set to a first tonal value; if the tonal value of the pixel is greater than the tonal-value threshold value TS or the tonal value of the pixel corresponds to the tonal-value threshold value TS, then the tonal value of the pixel is set to a second tonal value. In the present example, the tonal-value threshold value TS=60, the first tonal-value threshold value is 0 and the second tonal-value threshold value is 255.

The tonal value of the pixel having the coordinates 4,1 of the average-value difference image is 63. This value is greater than the tonal-value threshold value TS=60. Therefore, the tonal value of the pixel having the coordinates 4,1 of the binary image is set to 255.

Figure 10:
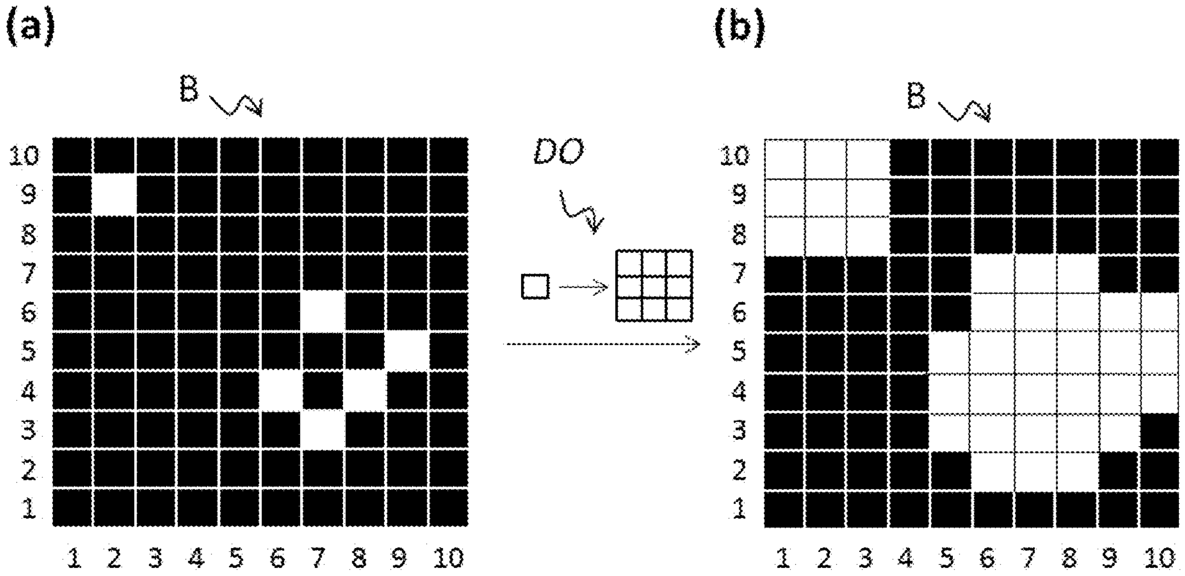

FIG. 10 shows by way of example and schematically how a dilated binary image is generated from a binary image.

The starting point is the binary image B in FIG. 10(*a*). The binary image B consists of 10×10=100 pixels. Each pixel is uniquely addressable by its coordinates. Each pixel is assigned a tonal value. There are only two tonal values, the tonal values 0 ("black") and 1 ("white").

A dilatation operator DO is applied to the binary image B. Said dilatation operator expands all pixels having the tonal value "white" to a matrix having 3×3 pixels having the tonal value "white". As a result, the white pixel having the coordinates 2,9 becomes a matrix having 9 white pixels; the pixels (having the coordinates 1,10; 2,10; 3,10; 1,9; 3,9; 1,8; 2,8; 3,8) directly adjacent to the pixel having the coordinates 2,9 likewise become white irrespective of what tonal value they have before (see FIG. 10(*b*)).

It is conceivable for the white pixels to be expanded to a different structuring element than a (3×3) matrix. It is conceivable for such a dilatation operator to be applied multiply.

Figure 11:
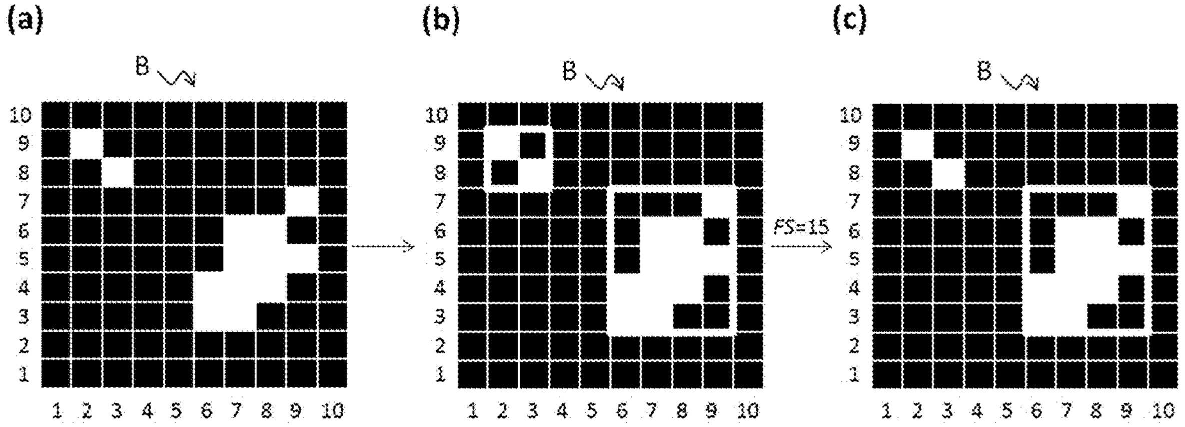

FIG. 11 shows by way of example and schematically how it is possible to identify groups of contiguous pixels in a binary image and to ascertain their sizes.

The starting point is the binary image B in FIG. 11(*a*). The binary image B consists of 10×10=100 pixels. Each pixel is uniquely addressable by its coordinates. Each pixel is assigned a tonal value. There are only two tonal values, the tonal values 0 ("black") and 1 ("white").

In a first step it is necessary to identify groups of contiguous pixels having the tonal value "white". Two groups of contiguous pixels having the tonal value "white" are to be identified in the binary image B. Two or more pixels are contiguous if each pixel has at least one directly adjacent pixel having the same tonal value (here "white"). The two identified groups are each provided with a white rectangular bounding border in FIG. 11(*b*).

In a further step it is necessary to ascertain the sizes of the groups. One possible method is illustrated by way of example in FIG. 10. In this case, each group of contiguous pixels is provided with a bounding border (see FIG. 11(*b*)). The bounding border satisfies all the following criteria:

- the bounding border is rectangular,
- its edges run parallel to the edges of the binary image,
- all pixels which have the tonal value "white" and which belong to a group of contiguous pixels lie within the bounding border,
- the bounding border comprises as few pixels as possible which do not belong to the group of contiguous pixels having the tonal value "white".

The size of a group can be specified as the number of all pixels encompassed by a bounding border. In the present case, the one bounding border encompasses four pixels and the other bounding border encompasses 20 pixels.

In a further step, the sizes of the areas are compared with a group threshold value FS. In the present example, the group threshold value FS=15 pixels. Therefore, the group having 4 pixels is smaller than the group threshold value FS and the group having 20 pixels is greater than the group threshold value FS.

Those groups which are of a size at least exactly equal to the group threshold value FS are of interest, then. That is the group having 20 pixels in FIG. 11(*c*).

Figure 12:
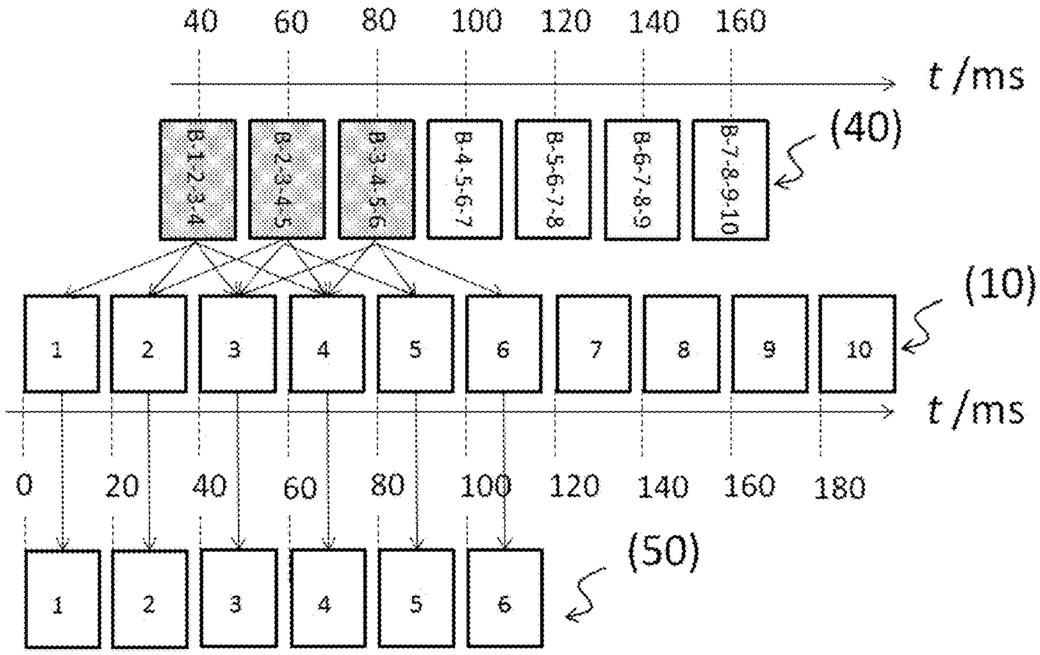

FIG. 12 shows by way of example and schematically the identification of those binary images in a sequence of binary images in which not a single group of contiguous pixels having the second tonal value is present which is greater than the group threshold value.

Each binary image of the sequence (40) of binary images has a unique identifier: B-1-2-3-4, B-2-3-4-5, B-3-4-5-6, B-4-5-6-7, B-5-6-7-8, B-6-7-8-9 and B-7-8-9-10.

Each binary image is assigned a point in time. The binary image having the identifier B-1-2-3-4 is assigned the point in time 40 ms, the binary image having the identifier B-2-3-4-5 is assigned the point in time 60 ms, and so on.

For each binary image a check was made in a preceding step to establish whether it contains at least one group of contiguous pixels having the second tonal value which is of a size equal to a defined group threshold value or which is greater than the defined group threshold value. In the present example, the binary images having the identifiers B-1-2-3-4, B-2-3-4-5 and B-3-4-5-6 have at least one group of contiguous pixels having the second tonal value which is of a size equal to the defined group threshold value or which is greater than the defined group threshold value. In the present example, the binary images having the unique identifiers B-4-5-6-7, B-5-6-7-8, B-6-7-8-9 and B-7-8-9-10 do not have a single area of contiguous pixels having a second tonal value which is of a size equal to the defined group threshold value or which is greater than the defined group threshold value.

It is only if a binary image has at least one group of contiguous pixels having the second tonal value which is of a size at least equal to the defined group threshold value that the binary image shows a movement which is above a motion threshold and is thus of interest for a more extensive analysis. Binary images which indicate no movement above a motion threshold are of no interest for further evaluation. Those images of the sequence of images which influenced the generation of the binary images which indicate no movement above a motion threshold are therefore erased in a further step.

In the present example, the images having the unique identifiers 1, 2, 3, 4, 5 and 6 influenced the generation of the binary images having the unique identifiers B-1-2-3-4, B-2-3-4-5 and B-3-4-5-6. These images thus likewise show a movement above a motion threshold and are therefore of interest for a more extensive analysis. The images having the unique identifiers 7, 8, 9 and 10 did not influence the generation of the binary images having the unique identifiers B-1-2-3-4, B-2-3-4-5 and B-3-4-5-6. Instead, they influenced the generation of the binary images having the unique identifiers B-4-5-6-7, B-5-6-7-8, B-6-7-8-9 and B-7-8-9-10. The binary images having the unique identifiers B-4-5-6-7, B-5-6-7-8, B-6-7-8-9 and B-7-8-9-10 show no movement above a motion threshold, however. Therefore, the images having the identifiers 7, 8, 9 and 10 also show no movement above ac motion threshold and are of no interest for a more extensive analysis. The images having the identifiers 7, 8, 9 and 10 are therefore erased.

This gives rise to a reduced sequence (50) of images, all of which show a movement above a motion threshold.

Figure 13:
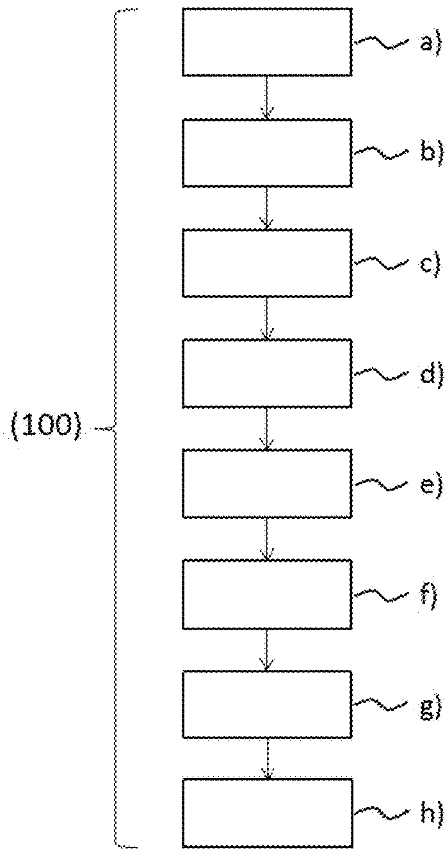

FIG. 13 shows one preferred embodiment of the method according to the invention in the form of a flow diagram. The method (100) comprises the steps:

a) Receiving a temporal sequence of images, wherein each image has a multiplicity of pixels, wherein each pixel is characterized by a tonal value, b) Generating a sequence of difference images from the sequence of images, by generating a respective difference image for each pair of adjacent images of the temporal sequence of images, wherein each difference image is characterized by a multiplicity of pixels each having a tonal value, wherein the tonal value of each pixel of each difference image represents an absolute value of the difference between the tonal values of the corresponding pixels of adjacent images, c) Generating a sequence of average-value difference images from the sequence of difference images, by a procedure in which a time window is defined which can accommodate a defined number of adjacent difference images, the time window is shifted image by image from the beginning of the sequence of difference images until the end of the sequence of difference images, and, during each shifting image by image, a respective average-value difference image is generated on the basis of the difference images encompassed by the time window, wherein the tonal value of each pixel of each average-value difference image represents an average value of the tonal values of the corresponding pixels of the difference images encompassed by the time window, d) Generating a sequence of binary images from the sequence of average-value difference images, by a procedure in which the tonal values of all pixels of each average-value difference image which lie below a defined tonal-value threshold value are set to a first tonal value, and the tonal values of all pixels of each average-value difference image which lic above the defined tonal-value threshold value or correspond to the defined tonal-value threshold value are set to a second tonal value, e)Identifying groups of contiguous pixels having a second tonal value in each binary image of the sequence of binary images, f) Determining the sizes of the groups for each binary image and comparing the respective size with a group threshold value, g) Identifying those binary images which have at least one group which is of a size equal to the group threshold value or which is greater than the group threshold value, h) Erasing all images of the temporal sequence of images which have not influenced the generation of the binary image identified in step g).

Figure 14:
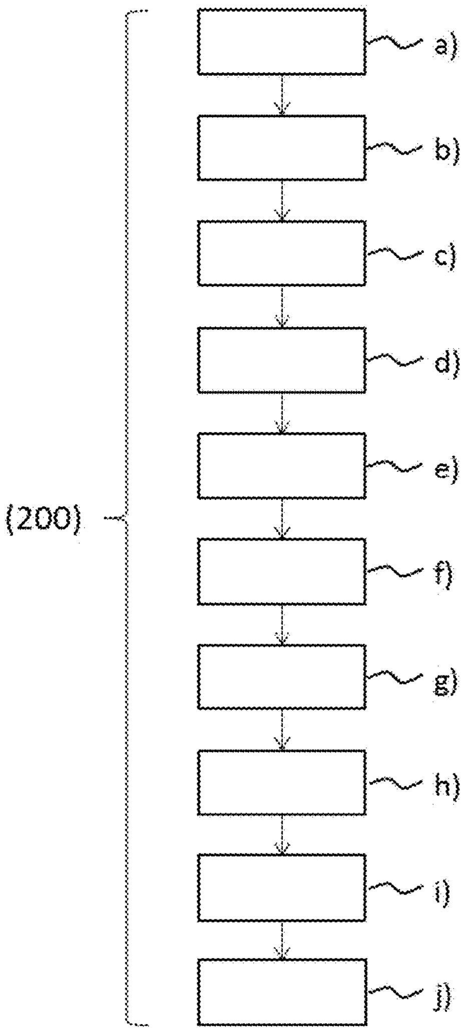

FIG. 14 shows a further preferred embodiment of the method according to the invention in the form of a flow diagram. The method (200) comprises the steps:

a) Receiving a temporal sequence of images, wherein each image has a multiplicity of pixels, wherein each pixel is characterized by a tonal value, b) Generating a sequence of difference images from the sequence of images, by generating a respective difference image for each pair of adjacent images of the temporal sequence of images, wherein each difference image is characterized by a multiplicity of pixels each having a tonal value, wherein the tonal value of each pixel of each difference image represents an absolute value of the difference between the tonal values of the corresponding pixels of adjacent images, c) Generating a sequence of average-value difference images from the sequence of difference images, by a procedure in which a time window is defined which can accommodate a defined number of adjacent difference images, the time window is shifted image by image from the beginning of the sequence of difference images until the end of the sequence of difference images, and, during each shifting image by image, a respective average-value difference image is generated on the basis of the difference images encompassed by the time window, wherein the tonal value of each pixel of each average-value difference image represents an average value of the tonal values of the corresponding pixels of the difference images encompassed by the time window, d) Generating a sequence of contrast-reduced average-value difference images from the sequence of average-value difference images by applying a Gaussian blur to all average-value difference images of the sequence of average-value difference images, e) Generating a sequence of binary images from the sequence of contrast-reduced average-value difference images, by a procedure in which the tonal values of all pixels of each contrast-reduced average-value difference image which lie below a defined tonal-value threshold value are set to a first tonal value, and the tonal values of all pixels of each contrast-reduced average-value difference image which lie above the defined tonal-value threshold value or correspond to the defined tonal-value threshold value are set to a second tonal value, f) Generating a sequence of dilated binary images from the sequence of binary images, by a procedure in which those pixels of each binary image which have the second tonal value are expanded singly or multiply to a shape of a defined structuring element, g) Identifying groups of contiguous pixels having a second tonal value in each dilated binary image of the sequence of dilated binary images, h) Determining the sizes of the groups for each dilated binary image and comparing the respective size with a group threshold value, i) Identifying those dilated binary images which have at least one group which is of a size equal to the group threshold value or which is greater than the group threshold value, j) Erasing all images of the temporal sequence of images which have not influenced the generation of a dilated binary image identified in step i).

Figure 15:
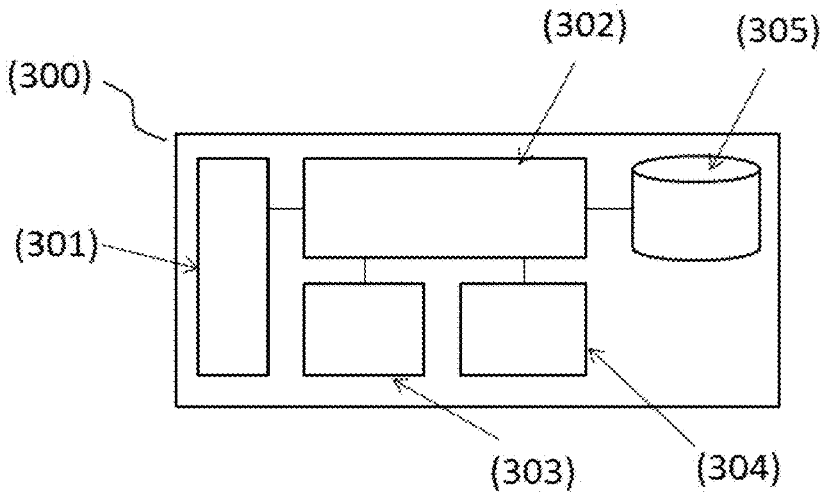

FIG. 15 shows by way of example and schematically one preferred embodiment of the device according to the invention.

The device (300) comprises an input unit (301), a control unit (302), a computing unit (303), an output unit (304) and a data storage unit (305).

The control unit (302) is configured to cause the input unit (301) to receive a sequence of images.

The control unit (302) is configured to cause the computing unit to generate a sequence of difference images from the sequence of images, to generate a sequence of average-value difference images from the sequence of difference images, to generate a sequence of contrast-reduced average-value difference images from the sequence of average-value difference images, to generate a sequence of binary images from the sequence of average-value difference images or the sequence of contrast-reduced average-value difference images, to generate a sequence of dilated binary images from the sequence of binary images, to identify a group of contiguous pixels in the binary images of the sequence of binary images or in the dilated binary images of the sequence of dilated binary images, to determine the size of each identified group in the binary images of the sequence of binary images or in the dilated binary images of the sequence of dilated binary images, to compare the determined size of each identified group with a threshold value and to identify the binary images or dilated binary images which have at least one group which is of a size equal to the threshold value or which is greater than the threshold value, to erase all images of the temporal sequence of images which do not have a single group of a size at least equal to the threshold value, wherein a reduced sequence of images arises.

The control unit (302) is configured to store the reduced sequence of images in the data storage unit (305) and/or to cause the output unit (304) to output the reduced sequence of images.

The invention claimed is:

1. A method for reducing video recordings to temporal segments in which one or more movements of an object above a motion threshold are recorded, the method including steps comprising:

a) receiving a temporal sequence of images, b) generating a sequence of difference images from the sequence of images, by generating a respective difference image for each pair of adjacent images of the temporal sequence of images, c) generating a sequence of average-value difference images from the sequence of difference images, by a procedure in which, for all groups of successive difference images having a defined number of difference images, the difference images associated with a group are averaged in each case, d) generating a sequence of contrast-reduced average-value difference images by applying a gaussian blur to all average-value difference images of the sequence of average-value difference images, e) generating a sequence of binary images from the sequence of average-value difference images, f) identifying groups of contiguous pixels in each binary image, g) determining the sizes of the groups of contiguous pixels and comparing the respective size of a group with a threshold value, h) identifying those binary images which have at least one group which is of a size equal to the threshold value or which is greater than the threshold value, and i) erasing all images of the temporal sequence of images which have not influenced the generation of a binary image identified in step hg).

2. The method as claimed in claim 1, wherein each image of the sequence of images has a multiplicity of pixels, wherein each pixel is characterized by a tonal value, wherein each difference image of the sequence of difference images is characterized by a multiplicity of pixels each having a tonal value, wherein the tonal value of each pixel of each difference image represents an absolute value of the difference between the tonal values of the corresponding pixels of two temporally directly successive images, wherein a time window is defined for generating the sequence of average-value difference images, which time window can accommodate a defined number of temporally directly successive difference images, wherein the time window is shifted image by image from the beginning of the sequence of difference images until the end of the sequence of difference images, and, during each shifting image by image, a respective average-value difference image is generated on the basis of the difference images encompassed by the time window, wherein the tonal value of each pixel of each average-value difference image represents an average value of the tonal values of the corresponding pixels of the difference images encompassed by the time window, wherein, for generating the sequence of binary images from the sequence of average-value difference images, the tonal values of all pixels of each average-value difference image which lie below a defined tonal-value threshold value are set to a first tonal value, and the tonal values of all pixels of each (contrast-reduced) average-value difference image which lie above the defined tonal-value threshold value or correspond to the defined tonal-value threshold value are set to a second tonal value.

3. The method as claimed in claim 2, furthermore comprising the following step after step e) and before step f):

generating a sequence of dilated binary images from the sequence of binary images, by a procedure in which those pixels of each binary image which have the second tonal value are expanded singly or multiply to a shape of a defined structuring element.

4. The method as claimed in claim 1, wherein the size of each group in step g) is set as the number of pixels having a second tonal value which belong to the respective group.

5. The method as claimed in claim 2, wherein, for ascertaining the size of a group of contiguous pixels in a binary image, a bounding border around the group is considered which satisfies the following criteria:

the bounding border is rectangular, its edges run parallel to the edges of the binary image, all pixels which have the second tonal value and which belong to a group of contiguous pixels lie within the bounding border, the bounding border comprises as few pixels as possible which do not belong to the group of contiguous pixels having the second tonal value, wherein the total number of pixels lying within the bounding border is set as the size of the group.

6. The method as claimed in claims 1, wherein the object is a living organism in the form of an animal, or another living organism.

7. The method as claimed in claim 6 wherein at least one movement is shaking of the body of the living organism or of part of the body of the living organism, activities of the living organism concerning its own body care, and/or licking, chewing, scratching and/or rubbing of the living organism.

8. A device comprising:

an input unit, a control unit, a computing unit, and an output unit and/or a data storage unit, wherein the control unit is configured to cause the input unit to receive a sequence of images, wherein the control unit is configured to cause the computing unit to carry out the following steps:

a) generating a sequence of difference images from the sequence of images, by generating a respective difference image for each pair of adjacent images of the temporal sequence of images, b) generating a sequence of average-value difference images from the sequence of difference images, by a procedure in which, for all groups of successive difference images having a defined number of difference images, the difference images associated with a group are averaged in each case, c) generating a sequence of contrast-reduced average-value difference images by applying a gaussian blur to all average-value difference images of the sequence of average-value difference images, d) generating a sequence of binary images from the sequence of average-value difference images, e) identifying groups of contiguous pixels in each binary image, f) determining the sizes of the groups of contiguous pixels and comparing the respective size with a threshold value, g) identifying those binary images which have at least one group which is of a size equal to the threshold value or which is greater than the threshold value, h) erasing all images of the temporal sequence of images which have not influenced the generation of a binary image identified in step g), wherein a reduced sequence of images is generated, wherein the control unit is configured to store the reduced sequence of images in the data storage unit and/or to cause the output unit to output the reduced sequence of images.

9. The device as claimed in claim 8, wherein the control unit is configured to cause the computing unit to:

a) receive a temporal sequence of images, b) generate a sequence of difference images from the sequence of images, by generating a respective difference image for each pair of adjacent images of the temporal sequence of images, c) generate a sequence of average-value difference images from the sequence of difference images, by a procedure in which, for all groups of successive difference images having a defined number of difference images, the difference images associated with a group are averaged in each case, d) generate a sequence of binary images from the sequence of average-value difference images, e) identify groups of contiguous pixels in each binary image, f) determine the sizes of the groups of contiguous pixels and comparing the respective size of a group with a threshold value, g) identify those binary images which have at least one group which is of a size equal to the threshold value or which is greater than the threshold value, and h) erase all images of the temporal sequence of images which have not influenced the generation of a binary image identified in step g).

10. The device as claimed in claim 8, wherein the object is a living organism in the form of an animal or another living organism.

11. A computer program product comprising a non-transitory computer storage medium having a computer program stored thereon that causes a computer to:

a) receive a temporal sequence of images, b) generate a sequence of difference images from the sequence of images, by generating a respective difference image for each pair of adjacent images of the temporal sequence of images, c) generate a sequence of average-value difference images from the sequence of difference images, by a procedure in which, for all groups of successive difference images having a defined number of difference images, the difference images associated with a group are averaged in each case, d) generate a sequence of contrast-reduced average-value difference images by applying a gaussian blur to all average-value difference images of the sequence of average-value difference images, e) generate a sequence of binary images from the sequence of average-value difference images, f) identify groups of contiguous pixels in each binary image, g) determine the sizes of the groups of contiguous pixels and comparing the respective size of a group with a threshold value, h) identify those binary images which have at least one group which is of a size equal to the threshold value or which is greater than the threshold value, i) erase all images of the temporal sequence of images which have not influenced the generation of a binary image identified in step h), and thereby generating a reduced sequence of images, and j) store the reduced sequence of images in a data storage unit and/or outputting the reduced sequence of images on a monitor.

* * * * *